(12) United States Patent
Guerin et al.

(10) Patent No.: US 11,834,872 B2
(45) Date of Patent: Dec. 5, 2023

(54) VEHICLE DOOR OPENING ASSEMBLY

(71) Applicant: U-Shin Italia S.p.A, Pianezza (IT)

(72) Inventors: Anthony Guerin, Pianezza (IT); Manu Sharma, Gurgaon (IN); Sachin Sharma, Gurgaon (IN)

(73) Assignee: U-Shin Italia S.p.A, Pianezza (IT)

( * ) Notice: Subject to any disclaimer, the term of this patent is extended or adjusted under 35 U.S.C. 154(b) by 161 days.

(21) Appl. No.: 17/431,325

(22) PCT Filed: Feb. 20, 2020

(86) PCT No.: PCT/EP2020/054558
§ 371 (c)(1),
(2) Date: Aug. 16, 2021

(87) PCT Pub. No.: WO2020/173813
PCT Pub. Date: Sep. 3, 2020

(65) Prior Publication Data
US 2022/0136289 A1    May 5, 2022

(30) Foreign Application Priority Data

Feb. 28, 2019 (EP) .................................... 19160039

(51) Int. Cl.
*E05B 81/90* (2014.01)
*B60Q 3/267* (2017.01)
(Continued)

(52) U.S. Cl.
CPC ............. *E05B 81/90* (2013.01); *B60Q 3/267* (2017.02); *E05B 77/02* (2013.01); *E05B 79/20* (2013.01); *E05B 81/04* (2013.01); *E05B 83/36* (2013.01)

(58) Field of Classification Search
CPC .......... E05B 81/25; E05B 81/90; E05B 77/02; E05B 77/10; E05B 77/12; E05B 79/20;
(Continued)

(56) References Cited

U.S. PATENT DOCUMENTS 10,145,152 B2 * 12/2018 Beck ..................... E05B 17/14
2016/0138303 A1 * 5/2016 Beck ..................... E05B 81/56
292/336.3
(Continued)

FOREIGN PATENT DOCUMENTS

CN     105604413 A    5/2016
CN     106687656 A    5/2017
(Continued)

OTHER PUBLICATIONS

Combined Chinese Office Action and Search Report dated May 7, 2022 in Chinese Patent Application 202080015139.7, 13 pages (with English Translation).
(Continued)

*Primary Examiner* — Christine M Mills
*Assistant Examiner* — Christopher F Callahan
(74) *Attorney, Agent, or Firm* — Oblon, McClelland, Maier & Neustadt, L.L.P.

(57) ABSTRACT

A vehicle door opening assembly adopting three positions: a hidden position, a ready position, and a release position. Guiding means comprising a slider support a handling element and can be moved by elastic means from the hidden position into the ready position. The slider is movable in translation from the hidden/retracted position, in which the slider and the handling element are contained in a release mechanism sheath, to the ready/deployed position when the elastic means are released. The handling element is fixed to the slider so as to be rotatable between a position coaxial with the slider and an inclined position protruding laterally (Continued)

Figure 1:
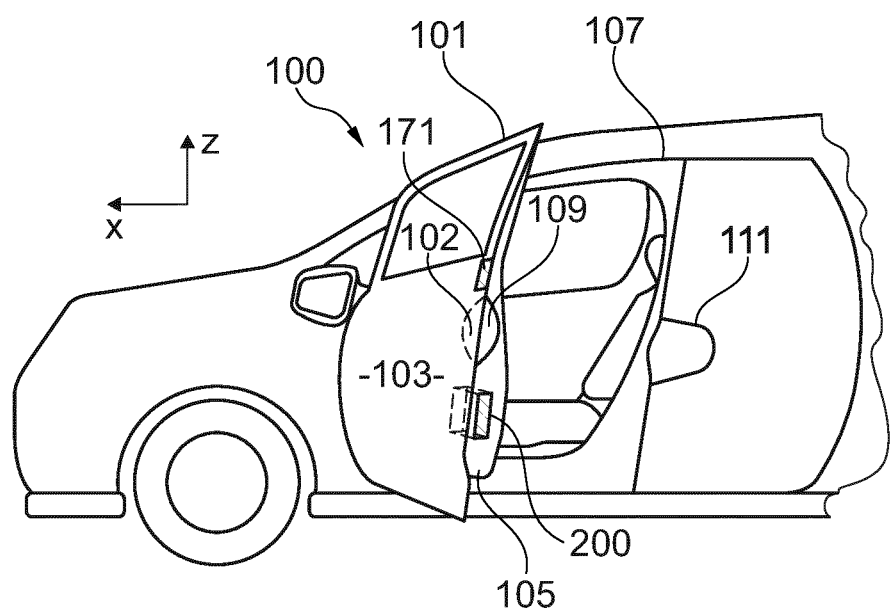

from the release mechanism sheath. Secondary elastic means cause the handling element to rotate in a visible inclined position when the slider reaches the ready/deployed position.

11 Claims, 4 Drawing Sheets

(51) Int. Cl.
  *E05B 77/02* (2014.01)
  *E05B 79/20* (2014.01)
  *E05B 81/04* (2014.01)
  *E05B 83/36* (2014.01)

(58) Field of Classification Search
  CPC ........ E05B 79/22; E05B 85/10; E05B 85/107; Y10T 292/57; Y10S 292/65
  See application file for complete search history.

(56) References Cited

U.S. PATENT DOCUMENTS

| 2016/0305164 A1 | 10/2016 | Bendel |
| 2019/0169889 A1 | 6/2019 | Beck |

FOREIGN PATENT DOCUMENTS

| DE | 10 2007 002 700 A1 | 7/2008 | | |
| DE | 10 2015 008 122 A1 | 12/2016 | | |
| DE | 102015008122 A1 * | 12/2016 | | |
| DE | 10 2016 114 494 A1 | 2/2018 | | |
| WO | WO 2015/062586 A1 | 5/2015 | | |
| WO | WO-2016037604 A1 * | 3/2016 | ............. | E05B 79/20 |
| WO | WO 2018/024405 A1 | 2/2018 | | |
| WO | WO-2018024405 A1 * | 2/2018 | ......... | E05B 47/0009 |

OTHER PUBLICATIONS

International Search Report dated Mar. 25, 2020 in PCT/EP2020/054558 filed on Feb. 20, 2020, 2 pages.

* cited by examiner

VEHICLE DOOR OPENING ASSEMBLY

The invention relates to a door opening assembly to control the opening of a vehicle door, in particular in the case of automated door latches that are controlled via electric means without mechanically actuated door handle lever or knob.

Automated door latches selectively lock or release vehicle door panels in an automated fashion. By automated door latches are herein designated door latches where the user does not provide the energy to actuate the latch through grasping and moving a handle lever, knob or other. In particular, most automated door latches comprise an electric actuator that sets a bolt, hook or lever in motion upon reception of an actuation signal so as to release the vehicle door.

Once the door panel is released, the user or an electric panel actuator swings or slides the panel to grant physical access the vehicle. The actuation signal is in particular generated after execution of an authentication process, using for example the remote detection of an authentication token such as a RFID card or module, a Bluetooth connected phone etc.

Automated door latches, under normal circumstances, do not require bulging handle levers on the exterior surface of the vehicle. The air drag of the vehicle can consequently be reduced, while the visual aspect of the vehicle can be streamlined.

However, in some particular cases, such as when the car battery is disconnected, e.g. in case of accident, or low on charge, for example after prolonged parking such as at an airport or train station, the electric actuation of the door latch becomes impossible. The vehicle consequently becomes inaccessible. Some vehicles comprise a back-up mechanical tumbler lock, hidden for example behind a car manufacturer logo. The user inserts the vehicle key in said lock and turns it so as to mechanically release the door panel.

In case of traffic collision or crash, a bystander or first response team may wish to open the door, for example to extract the passengers of the vehicle or provide medical care. The bystanders and first response team do not possess the key. Furthermore, as an additional security measure, most vehicles comprise safety modules that disconnect the battery to immediately stop the engine and avoid sparks and reduce hazards.

In such cases, the automated door latches become inoperable from the outside, while the driver and/or passengers may be unconscious or unable to actuate the latch from inside. Other solutions would imply to break a window or wait for rescue personnel to forcibly remove the door or part of the vehicle body using specific hydraulic or electric rescue tools (shears, plyers, etc.). These solutions are lengthy and can cause additional trauma to already injured passengers.

In order to overcome the aforementioned drawbacks, the invention proposes a vehicle door opening assembly to control the opening of a vehicle door comprising an automated door latch mechanism, configured to release the vehicle door when actuated, comprising:
- back-up actuation condition detection means, configured to detect a back-up actuation condition,
- a back-up release module, comprising a handling element, mechanically linked to the automated door latch mechanism so as to enable release of the vehicle door in back-up actuation conditions, the handling element being configured to be able to adopt three positions:
  - a hidden position, said position being adopted in absence of detected back-up actuation condition,
  - a ready position, where it is accessible to the user to mechanically release the vehicle door, said position being adopted upon reception of a control command emitted by the back-up condition detection means, and
  - a release position, adopted when a user interacts with the handling element in ready position, in which the back-up release module causes the automated door latch mechanism to mechanically release the vehicle door, it further comprises guiding means supporting the handling element and elastic means to move the guiding means and the handling element from the hidden position into the ready position, said guiding means comprise a slider carrying the handling element and a release mechanism sheath open on one end, the sheath contains the slider, the slider being configured to move in translation from a retracted position in which the slider and the handling element are contained in the release mechanism sheath to a deployed position in which the handling element is protruding out of the release mechanism sheath when the elastic means are released, the handling element is fixed to the slider so as to be rotatable with a rotation axis perpendicular to the slider motion between a retracted position in which it is coaxial with the slider and a position in which it is inclined so as to protrude laterally from the release mechanism sheath in direction of the user, it further comprises secondary elastic means that cause the handling element to rotate in a visible position when the slider reaches the deployed position.

The door panel can consequently be released mechanically using the back-up release module that is selectively deployed in cases where no electrical power is available such as in case of a collision or when the battery is low on charge.

The vehicle door opening assembly may present one or more of the following characteristics.

The handling element may be inaccessible to the user when in hidden position.

The assembly may comprise a release mechanism, configured to constrain the elastic means when the handling element is in the hidden position and to release the elastic means, and release the elastic means upon reception of a control command emitted by the back-up condition detection means.

The release mechanism may block the slider in retracted position to constrain the elastic means, and the handling element may be articulated to the slider using a hinge with a hinge pin having a breaking strength lower than the strength required to free the slider from the release mechanism when said mechanism is blocking the slider.

The release mechanism may comprise on one hand a shoulder on a side of the slider and on the other hand an electric actuator, and a actuator finger may be driven by said electric actuator from a locking position of the mobile finger in which it rests against the shoulder of the slider to block the slider in its retracted position, and a free position of the mobile finger in which the mobile finger releases the shoulder so that the slider can reach its deployed position.

The electric actuator may be a bistable relay with two extremal rest positions of an actuator finger, and a coil the actuation of which causes the actuator finger to switch from one to the other extremal position to move the mobile finger in its free position.

The handling element may comprise a ring, and the user may have to pull on said ring to bring it from the ready position to the release position.

The emergency condition detection means may comprise at least one of the following: an accelerometer to detect acceleration values higher than a predetermined threshold in case of collision, a voltmeter configured to detect a low charge state of a vehicle battery.

The back-up release mechanism may comprise a Bowden cable, connected on one hand to the guiding means or the handling element, and on the other hand to the door latch mechanism, with an inner cable being pulled with respect to a sleeve when the handling element reaches its release position, said pulling of the inner cable causing mechanical actuation of the door latch mechanism to release the vehicle door.

The invention also relates to a vehicle door assembly comprising:
- a door panel, configured to be movable between a closed position in which it bars access to an inner space of a vehicle by fitting in a frame so as to close a bodywork of the vehicle and an open position in which it allows access to the inner space of the vehicle through the open frame,
- a latch control unit, and authentication unit connected to said latch control unit configured to authenticate a user, the latch control unit being configured to automatically actuate a door latch mechanism to release the door panel in case of positive authentication, characterized in that it further comprises a vehicle door opening assembly as previously mentioned.

The vehicle door assembly may further comprise a cover flap, covering the handling element when in hidden position.

The vehicle door assembly may further comprise a signalling element situated in close proximity to the handling element when in ready position, the signalling element comprising:
- a light source,
- a transparent cover covering the light source, with an exterior surface through which light from the light source can be emitted to the exterior of the vehicle,
- a back-up power source to provide electric power to the light source, the signalling element being connected to the back-up actuation condition detection means, and configured to power the light source when back-up actuation conditions are detected by said detection means to provide visual indication when the handling element is in ready position.

The signalling element may comprise a mask on at least a portion of the exterior surface, the mask forming, when the light source emits light, backlit characters or pictograms indicating presence, function and/or actuation instructions of the back-up release module.

Figure 2:
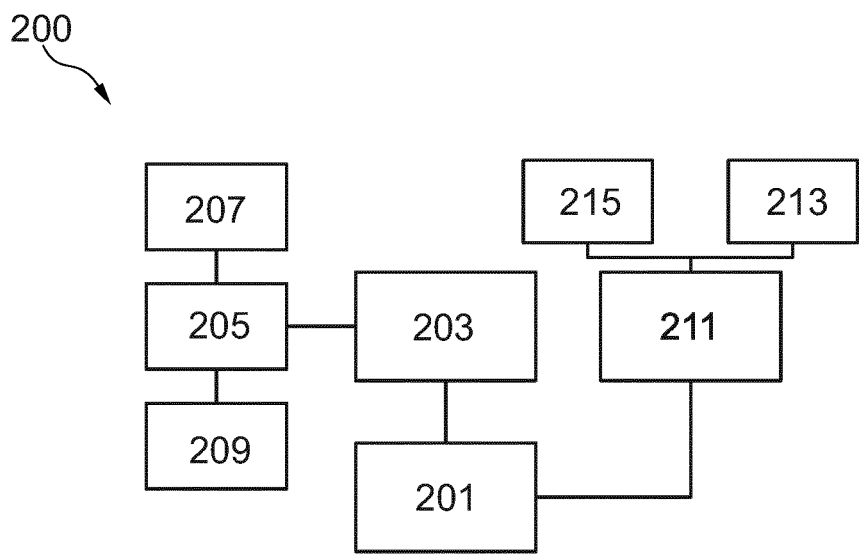
Figures 3A, 3B, 3C:
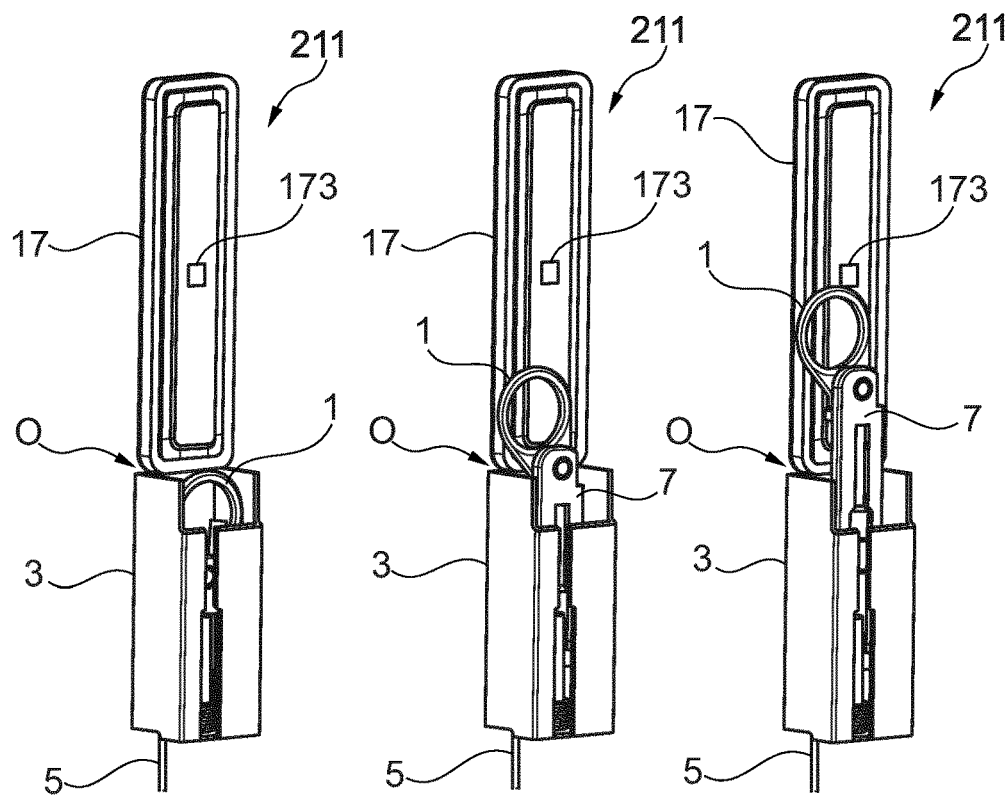
Figure 4:
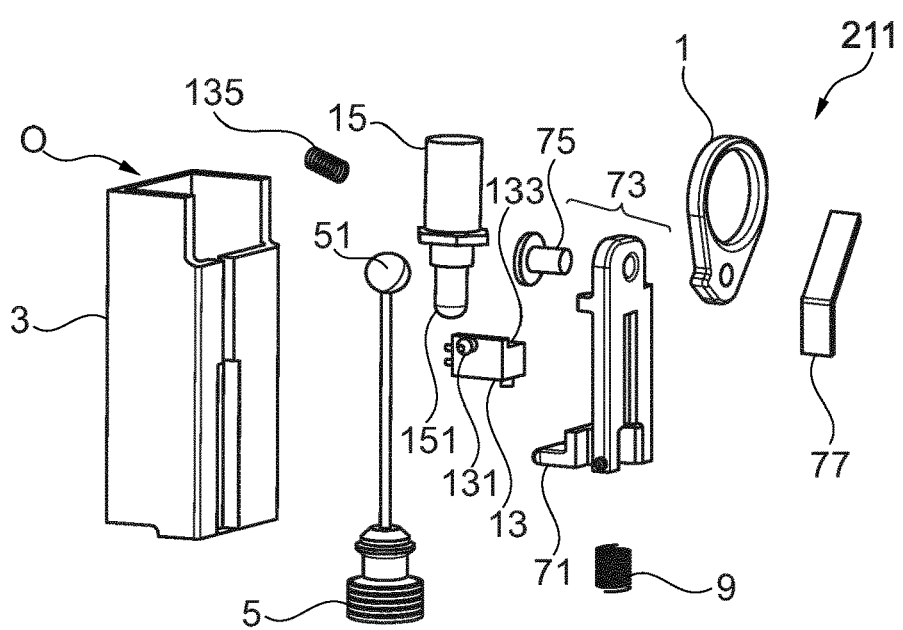
Figure 5A:
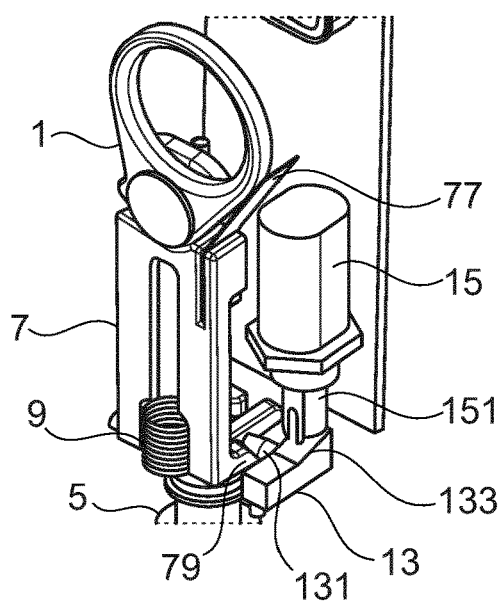
Figure 5B:
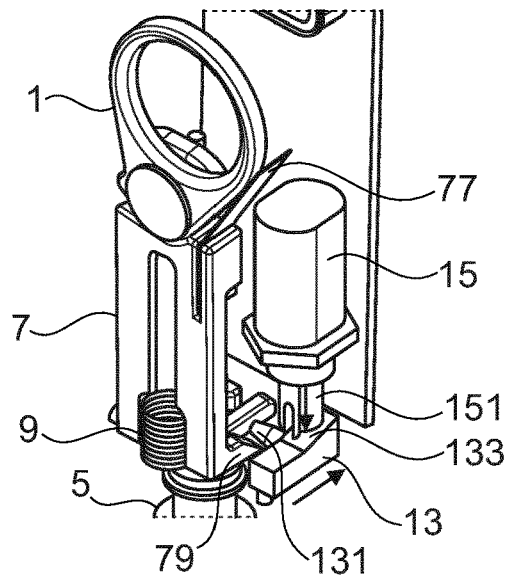
Figure 5C:
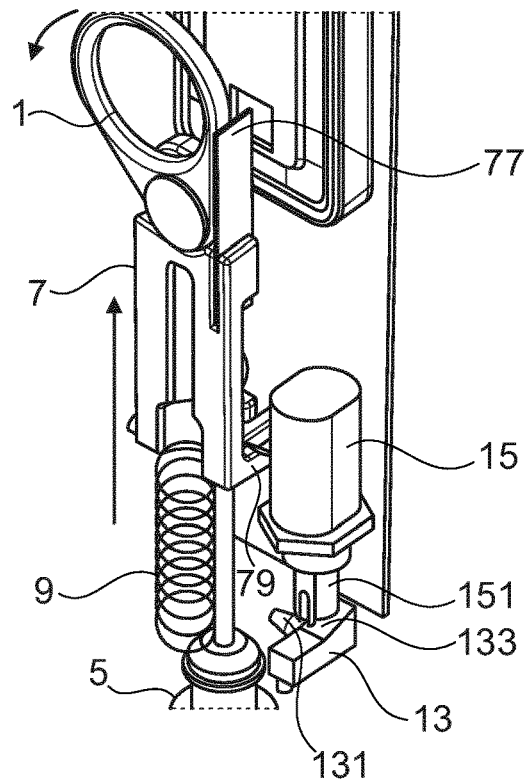
Figure 6:
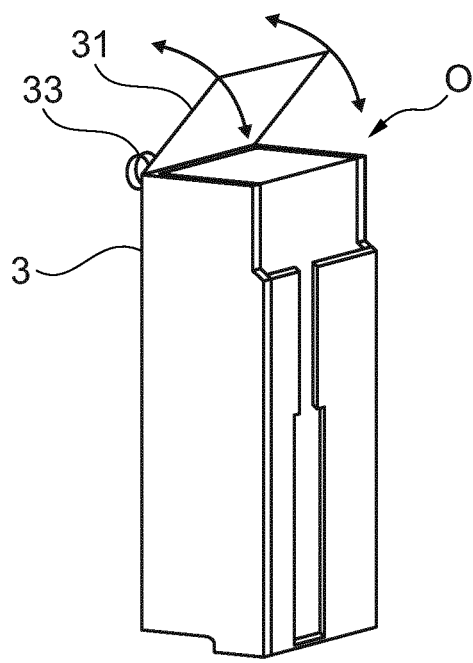
Figure 7:
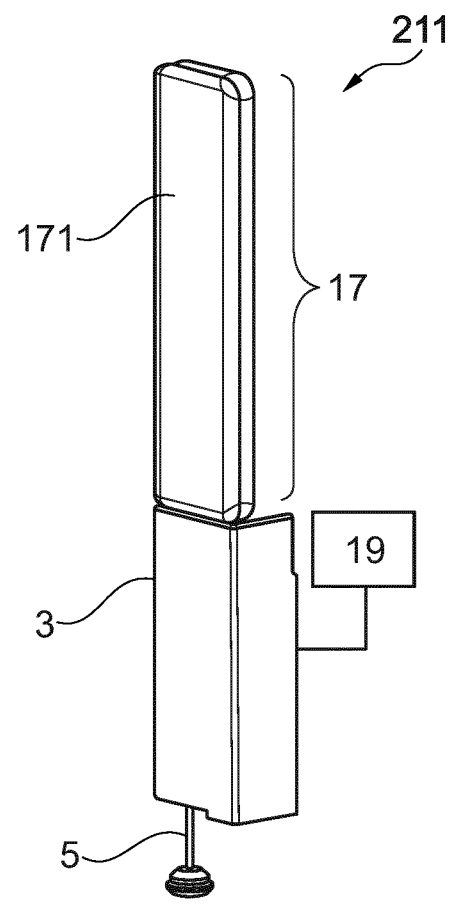
Figure 8:
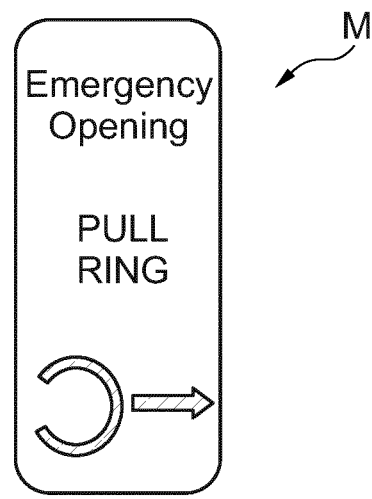

Other characteristics and advantages of the invention will appear at the reading of the following description, given in an illustrative and not limiting fashion, of the following figures, among which:

FIG. 1 is a schematic representation of a vehicle with an open door,

FIG. 2 is a block diagram of the main functional components of a vehicle door opening assembly, FIGS. 3a, 3b, 3c show a backup release module in different positions, FIG. 4 is an exploded view of the components of the release module of FIGS. 3a, 3b, 3c FIGS. 5a, 5b and 5c illustrate the way a particular embodiment of release mechanism for modules as in the previous figures works, FIG. 6 is a schematic view of an alternative embodiment of a release mechanism sheath, FIG. 7 is a perspective view of the back-up release module of FIGS. 3a, 3b, 3c viewed from outside the vehicle, FIG. 8 shows an example of a mask for a signalling element for a back-up release module according to a specific embodiment.

In all figures, the same references apply to the same elements.

Though the figures refer to precise embodiments of the invention, other embodiments may be obtained by combining or altering slightly the represented embodiments. Said new embodiments are also within the scope of the invention.

For spatial orientation, a longitudinal horizontal axis x is defined along the normal forward motion of the considered vehicle with straight wheels (i.e. when not turning). A vertical top-down axis z is defined using gravity when considering the vehicle on flat terrain. The wheel axes (when straight) define a transverse axis, orthogonal to the previous two axes. Terms such as "inwards" "outwards" etc. are defined with respect to an outer surface of the vehicle, corresponding to the apparent bodywork when viewing the vehicle from outside its cabin.

FIG. 1 is a schematic view of a front portion of a vehicle comprising a vehicle door assembly 100, with a vehicle door 101 in open position. The vehicle door 101 comprises a door panel 103 and a door body 105. The door panel 103 is relatively thin, and forms part of the vehicle bodywork. The door body 105 contains different modules such as a housing for at least a portion of a window when said window is slid down, a motor to slide up and down said window, various control elements (window opening/closing, inner door handle, rear view mirror adjustment etc.) and speakers for audio media.

The vehicle body 105 also contains at least portion of vehicle door opening assembly 200 which selectively locks or releases the vehicle door 101 for opening. A complementary portion of the vehicle door opening assembly 200 can be contained in a door frame 107 or other places inside the vehicle.

The vehicle door 101 is usually found in one of three states: locked, released and open. In the locked state, the vehicle door 101 closes the vehicle 100 by fitting in the door frame 107 and physically bars access to the vehicle cabin by closing the vehicle bodywork. In said locked state, the vehicle door opening assembly 200 prevents its motion.

In the released state, the vehicle door opening assembly 200 does not prevent the motion of the vehicle door 101, while the vehicle door 101 is still barring access to the vehicle cabin.

In the open state (FIG. 1), the vehicle door 101 has been slid or swung in a position in which is gives passengers access to the cabin.

The motion from the released position to the open position can either be caused by a motor or by direct action of the user, in particular with pneumatic or mechanical assistance. In the represented vehicle door assembly 100, the user grasps a fixed door handling element. The fixed door handling element is here in particular a lip 102 of the door panel 103, situated on its periphery opposite door hinges around which the vehicle door 101 swings into open position.

To grasp said door panel lip 102, the user inserts his fingers in a recess 109 of the door body 105 accessible through an indentation 111 in a neighbouring bodywork surface situated behind the vehicle door 101, and/or partially overlapped by said vehicle door 101. This surface can either be a column (central or rear) of the vehicle bodywork, or a rear door panel.

As an alternative the recess 109 can be situated in the vehicle door panel 101, for example under the door window, or the door panel 103 can protrude with respect to the neighbouring bodywork surface to form the fixed door handling element. Otherwise, a dedicated fixed handle lever, knob or other can be implemented on the outer surface of the door panel 103.

The vehicle door opening assembly 200 comprises in particular an automated door latch. An automated door latch is a door latch that does not require the user to set in motion a vehicle door handle to provide the energy to actuate a latch mechanism to release the vehicle door 101.

The principal components of such a door latch 200 are represented as blocks of a block diagram in FIG. 2.

The vehicle door latch 200 comprises a latch mechanism 201. Said latch mechanism 201 comprises for example a movable bolt, lever or hook, cooperating with a strike plate of the door frame 107. To actuate the door latch 200 and release the door 101, the bolt is set in motion in and out of the strike plate through an electric motor or actuator 203, for example via a rack and pinion mechanism. The electric actuator 203 is in particular supplied with electric current from a vehicle battery.

The electric actuator 203 is controlled by a control unit 205, comprising for example transistors to selectively provide or not electric current to the electric actuator 203.

To control the access to the vehicle, the control unit 205 is connected to an authentication unit 207 and an interaction sensor 209.

The control unit 205 comprises electronic or digital processing means such as a processor and electronic memory. The control unit 205 can either be a dedicated module for example in form of an integrated circuit, or be integrated in a vehicle control unit controlling other vehicle functions.

The authentication unit 207 comprises for example an antenna, to communicate with a security token such as a RFID circuit in a card or key, a Bluetooth antenna to connect with a phone on which security data (including for example a cryptographic key) is stored. As an alternative, the authentication unit can comprise biometric readers, such as fingerprint readers. The authentication unit 207 identifies and authenticates the users carrying the appropriate security token or biometric properties, so as to release the door only for authorised users.

The interaction sensor 209 is configured to detect either the presence of a user or the security token such as a RFID or Bluetooth connected phone in a predetermined perimeter, or to detect a contact of the user with the fixed door handling element 109, 111, for example using a capacitive detector.

The interaction sensor 209 detects actions of a user indicative of an intention to access the vehicle, and the control unit 205 causes the authentication unit 209 to interrogate the presence and authenticity of a security token when such an action is detected.

Portions of the authentication unit 207 and interaction sensor 209 can be combined in single elements: a RFID antenna for example can be used both to detect the presence of a RFID tag and to perform authentication and consequently be shared by both the authentication unit 207 and the interaction sensor 209.

The vehicle door opening assembly 200 also comprises a back-up release module 211 and back-up actuation condition detection means 213.

The back-up actuation condition detection means 213 are configured to detect conditions in which the electric motor 203 cannot be actuated to cause the door 101 to be released. Such back-up actuation conditions include for example a depleted or faulty car battery, or a crash of the vehicle. In particular, in case of a crash or traffic collision of the vehicle 100, safety measures imply a disconnection of the battery to stop the vehicle motor and avoid potential additional harm to the passengers, bystanders or first response personnel.

The back-up actuation condition detection means 213 comprise for example a voltmeter connected to the battery to detect battery voltage values under a predetermined threshold indicative of battery depletion or fault, and accelerometers to detect acceleration values higher than predetermined thresholds caused by collisions and rollovers of the vehicle.

The back-up actuation condition detection means 213 may in particular be shared with other information, diagnostics and security modules of the vehicle. The accelerometers can for example also be used to trigger the deployment of security cushions (airbags), while the voltmeter can also be used to provide information and diagnostics about battery charge level at dashboard level.

For increased security, the back-up actuation condition detection means 213 may be implemented in a dedicated module in the vehicle doors 101, more particularly one in each vehicle door 101. Said module could further comprise a back-up power source, either a capacitor or small battery, so as to detect potential back-up actuation conditions even if current supply is interrupted before detection of said conditions.

When a back-up actuation condition is detected, the back-up release module 211 is made available to the user for mechanical actuation of the latch mechanism 201 to release the door 101 and grant access to the vehicle interior For non-crash related back-up cases such as the depletion of the battery, the back-up release module 211 is connected to a mechanical back-up authentication unit 215, such as a discrete or hidden mechanical tumbler lock, in which the user inserts a vehicle key to make the back-up release module 211 available and release the vehicle door 101.

The back-up release module 211 is represented in FIGS. 3a, 3b and 3c.

The back-up release module 211 comprises a handling element 1, here a ring of a diameter sufficient for a user to insert at least one finger in it, and be able to pull said handling element 1. The handling element 1 is mechanically linked to the latch mechanism 201 so that a specific action (pulling) of the user on the handling element 1 causes actuation of the latch mechanism 201.

The back-up release module 211 can in particular be implemented inside the recess 109 forming the fixed door handling element, so that its handling element 1 is in majority in a plane parallel to the door panel lip 102.

In FIG. 3a, the handling element 1 is hidden inside a release mechanism sheath 3, which also houses other elements of the back-up release module 211. In said hidden position, the handling element is invisible for a user outside of the vehicle. The hidden position is the position adopted in normal condition, in absence of detected back-up actuation conditions, and in case of battery failure.

In FIG. 3b, the handling element 1 is represented in a ready position in which it protrudes from an open end 0 of the release mechanism sheath 3. In the ready position, the handling element is visible to a user outside of the vehicle for back-up actuation of the lock mechanism 201.

The ready position is adopted in particular in case of a detected crash. In the ready position the handling element 1 is both visible and graspable by a user outside of the vehicle. For example, the handling element 1 may be of a bright colour (red, pink, green, fluorescent etc.) contrasting with the colour of the bodywork, and a portion of said handling element 1 may protrude from the recess 109 beyond the lip 102 when in ready position.

In FIG. 3c, the handling element 1 is represented in a release position in which it further protrudes from the release mechanism sheath 3. The release position is adopted when the user grasps the handling element 1 and pulls on it. In the release position, the back-up release module 211 causes the latch mechanism 201 to release the door 101, here in particular by pulling on the inner cable of a Bowden cable 5 partially visible under the release mechanism sheath 3.

The Bowden cable 5 is, at its other end, connected to the latch mechanism 201. A pulling action on the inner cable of the Bowden cable 5 with respect to its sleeve causes for example motion of the bolt out of the strike plate to release the door 101.

Elements comprised in the back-up release module 211 are represented in FIG. 4, which is an exploded view of part of said back-up release module 211.

The handling element 1 is guided by guiding means comprising here a slider 7. The slider 7 is mobile in translation in the release mechanism sheath 3 between a retracted position in and a deployed position. In retracted position, the slider 7 is close to a bottom of the release mechanism sheath 3, and contained inside said sheath 3. In deployed position, the slider 7 is close to an open end 0 of the release mechanism sheath 3, and partially protrudes from said sheath 3.

The slider 7 comprises fingers 71 that cooperate with a knob 51 of the Bowden cable 5 and a handling element hinge 73, with a hinge pin 75. The handling element 1 is connected to the slider 7 via the handling element hinge 73. The hinge pin 75 is therefore inserted in corresponding holes in the handling element 1 and slider 7.

The handling element 1 is articulated to the slider 7 with an axis perpendicular to the slider 7 motion. In the hidden position, the handling element 1 is in a retracted position in which it is coaxial with the slider 7 and contained in the release mechanism sheath 3. In the ready position, the handling element 1 is inclined outwards of the release mechanism sheath 3 so as to protrude laterally from the release mechanism sheath 3 in direction of the user. Secondary elastic means 77, here a blade spring cause the handling element 1 to rotate in the inclined position when the slider 7 reaches the deployed position.

The guiding means also comprise elastic means 9, here a coil spring, situated between the slider 7 and the bottom plate of the release mechanism sheath 3. The elastic means 9 are constrained when the slider 7 is in retracted position and the handling element 1 in hidden position. When released, they cause the slider 7 to reach the deployed position and the handling element 1 to reach the ready position.

To selectively constrain or release the elastic means 9, the back-up release module 211 comprises a release mechanism, configured to constrain the elastic means when the handling element 1 is in the hidden position and to release the elastic means 9 when the back-up actuation condition detection means 213 emit an electric or electronic control command corresponding to the positive detection of back-up actuation conditions.

In a particular embodiment, the handling element 1 is inaccessible to the user when in hidden position, for example by being covered with a flap (see FIG. 6).

In case of battery depletion detected without accelerations corresponding to a potential accident, according to this particular embodiment, the release mechanism would further require the user to actuate the mechanical back-up authentication unit 215 for added security and bring the handling element 1 from its hidden position into its ready position where it would be accessible.

Otherwise, the user can grab the handling element 1 in hidden position. Actuation in absence of back-up conditions can be made impossible for example by uncoupling means between the handling element 1 and the latch mechanism 201 that uncouple motion of the handling element 1 and actuation of the latch mechanism 201 unless back-up conditions are detected.

The release mechanism and the release procedure of the slider 7 is represented in FIGS. 5a, 5b, 5c to illustrate its functioning. In FIG. 5a, the slider 7 is represented in its retracted position, and the handling element 1 is in hidden position. In FIG. 5b, the slider 7 is still in its retracted position but is released. In FIG. 5c, the slider 7 reached its deployed position, and the handling element 1 is in its ready position.

The slider 7 comprises a shoulder 79 protruding on one of its sides parallel to its motion. A blocking indexer 13 is used to control the movement of the slider 7. The blocking indexer 13 also comprises a ramp 133, and an indexer spring 135 that pushes the blocking indexer 13 in the blocking position.

In FIG. 5a, the mobile finger 131 rests against the shoulder 79, restraining the slider 7 in its retracted positon. This position of the blocking indexer 13 is maintained through the action of the indexer spring 135.

An electric actuator 15 has an actuator finger 151 resting on said ramp 133. When the back-up actuation condition detection means 213 emit a control command, the electric actuator 15 is actuated, and its actuator finger 151 pushes against the ramp 133.

The electric actuator 15, when actuated, causes the blocking indexer 13 to slide from the blocking position, thereby compressing the indexer spring 135 (not visible in FIG. 5a). The mobile finger 131 backs away from the shoulder 79, and the slider 7 is consequently released.

The action of the actuator finger 151 and the resulting motion of the blocking indexer 13 are represented in FIG. 5b by arrows.

The electric actuator 15 can in particular be a bistable relay, of the type described in patent EP 2 163 792 in the name of Valeo Sicherheitssysteme GmbH. Such actuators have an actuator finger mobile between two extremal positions, corresponding to rest positions of actuator elastic means. Electric actuation of a coil causes the actuator finger 151 to switch from one to the other extremal position, and no continuous supply of current is required to keep the actuator finger 151 in either extremal position.

Once the blocking indexer 13 releases the slider 7, the elastic means 9, which were constrained in the retracted position of said slider 7, push the slider 7 in its deployed position. The secondary elastic means 77 then push the handling element 1 in rotation into its ready position. In FIG. 5c, the slider 7 is in its deployed position.

The motions of the slider 7 and of the handling element 1 are represented by arrows in FIG. 5*c*.

In particular embodiments, the actuator finger 151 could block the shoulder of the slider 7 or directly the handling element 1. However, the presence of the blocking indexer 13 makes it possible to dispose the actuator 15 with its body in coaxial fashion with the slider 7 movement, inside the release mechanism sheath 3. The release mechanism sheath 3 can consequently have a smaller cross-section perpendicular to slider 7 movement.

A dedicated back-up power supply, such as a capacitor or a smaller battery inside the back-up release module 211 can be used to provide electric current to the electric actuator 15.

For added security, the hinge pin 75 of the slider 7 can be configured as a privileged breaking point in case of unintended pulling of the handling element 1. In particular, said hinge pin 75 can be configured to have a breaking strength lower than the strength required for freeing the slider 7 from the release mechanism when the mobile finger 131 is against the shoulder 79*s* of the slider 7.

FIG. 6 is a schematic representation of the release mechanism sheath 3 according to a specific additional embodiment.

In said embodiment, the release mechanism sheath 3 comprises an additional flap 31, which closes the open end 0 of the release mechanism sheath 3 when the handling element 1 is in its hidden position. The flap 31 is in particular hinged to a ridge of the open end 0 of the release mechanism sheath 3.

The flap 31 is maintained in closed position by elastic closing means 33. When in closed position, the flap 31 is flush with the surrounding door body 105 or door panel 103 surface, or slightly in recess. Consequently, when the flap 31 is closed, it is harder for an unauthorized person to access the handling element 1 or directly the knob 51 of the Bowden cable 5 to forcibly open the vehicle door 101.

When the slider 7 is released, the handling element 1 pushes the flap 31 open from inside the release mechanism sheath 3 (from below the flap in FIG. 6).

A car alarm trigger can also be linked to unauthorized movement or actuation of the back-up release module 211 or parts of it. In particular, said alarm can for example be triggered by motion of the flap 31 in present. Motion of the knob 51 or of the slider 7 in absence of detected back-up actuation conditions, or separation of knob 51 and fingers 71 of the slider 7 could be interpreted as an attempt to break into the vehicle, and trigger the car alarm.

The back-up release mechanism 211 of FIGS. 3*a* to 3*c* and 4 further comprises a signalling element 17, disposed in close proximity to the handling element 1 when in ready position. The signalling element 17 is discussed hereafter in relationship with FIGS. 7 and 8.

FIG. 7 is a view of the back-up release module 211 viewed from outside the vehicle. In particular, an apparent exterior surface 171 of the signalling element 17 is visible (see also FIG. 1). The signalling element 17 is in this particular embodiment placed directly above the release mechanism sheath 3 containing most parts of the back-up release mechanism 211. In the example of FIG. 1, the apparent exterior surface 171 is integrated in a window frame column of the vehicle.

In FIG. 7, the back-up release module 211 further comprises a rearming unit 19, configured to rearm the back-up release module 211 when normal conditions resume. For example, once the back-up actuation condition detection means 213 do not detect back-up actuation conditions anymore and/or current from the car battery is restored an electric rearming motor of the rearming unit 19 can bring the slider 7 back into its retracted position, and the electric actuator 15 is actuated in reverse to lock the slider 7 in said retracted position once again.

The signalling element 17 comprises in particular at least one light source 173 (see FIGS. 3*a*, 3*b*, 3*c*) such as a light emitting diode. A dedicated back-up power source such as a capacitor or a small battery can be integrated in the signalling element 17 to power the light source when power from the car battery is unavailable. Said back-up power source can also provide electric power to actuate the electric actuator 15.

The apparent exterior surface 171 is the outer surface of a transparent cover that covers the light source 173, and through which light from said light source 173 is emitted outside of the vehicle, to be seen by bystanders or first response personnel. The signalling element 17 may further comprise light guiding or diffusion means to distribute the light from the light source 173 more evenly over the apparent surface 171.

In particular, the transparent cover can be a polycarbonate plate. The cover can comprise colouring pigments incorporated in its material, in particular black or dark grey pigments, so as to appear dark and uniform when the light source 173 is not provided with power.

The signalling element 17 is connected to the back-up actuation condition detection means 213, and is configured to power the light source 173 when back-up actuation conditions are detected to provide visual indication when the handling element 1 when it is in ready position.

To aid in a rapid and efficient rescue in case of an accident, the signalling element 17 comprises a mask M on a portion of the transparent cover. The mask M forms, when the light source is on, backlit characters and/or pictograms indicating presence, function and/or actuation instructions of the back-up release module 211.

One such example of such a mask is depicted in FIG. 8. The mask M of FIG. 8 forms, when backlit, the characters "Emergency Opening PULL RING". An image of a ring and an arrow are represented, indicating the pulling direction for the ring forming the handling element 1. The characters and drawings can light up or blink so as to indicate the procedure to release the vehicle door 101 despite a disconnected car battery in case of collision or accident.

The signalling element 17 could also be configured not to power the light source 173 in case of battery failure without accident (low battery voltage detected without detection of high acceleration values).

The back-up release module 211 according to the invention allows combining a streamlined automated door opening assembly 200, in particular without a moving handle lever with the possibility to release the vehicle door 101 in cases where the car battery cannot provide electrical power to actuate the automated door opening assembly 200 as would normally be the case.

Car manufacturers have consequently more freedom to conceive cars with apparently uniform doors and with a reduced air drag, while emergency access to the vehicle cabin in cases of battery failure or accident can be maintained, thus improving security of the passengers.

The invention claimed is:

1. A vehicle door opening assembly to control the opening of a vehicle door comprising an automated door latch mechanism, configured to release the vehicle door when actuated, comprising:
   back-up actuation condition detection means, configured to detect a back-up actuation condition, a back-up release module, comprising a handling element, mechanically linked to the automated door latch mechanism so as to enable release of the vehicle door in back-up actuation conditions, the handling element being configured to be able to adopt three positions:
- a hidden position, said position being adopted in absence of detected back-up actuation condition,
- a ready position, where it is accessible to a user to mechanically release the vehicle door, said position being adopted upon reception of a control command emitted by the back-up condition detection means, and
- a release position, adopted when the user interacts with the handling element in ready position, in which the back-up release module causes the automated door latch mechanism to mechanically release the vehicle door, guiding means, supporting the handling element and elastic means to move the guiding means and the handling element from the hidden position into the ready position, said guiding means comprising a slider carrying the handling element and a release mechanism sheath open on one end, the sheath containing the slider, the slider being configured to move in translation from a retracted position in which the slider and the handling element are contained in the release mechanism sheath to a deployed position in which the handling element is protruding out of the release mechanism sheath when the elastic means are released, the handling element is fixed to the slider so as to be rotatable with a rotation axis perpendicular to the slider motion between a retracted position in which it is coaxial with the slider and a position in which it is inclined so as to protrude laterally from the release mechanism sheath in direction of the user, and secondary elastic means that cause the handling element to rotate in a visible position when the slider reaches the deployed position.

2. The vehicle door opening assembly according to claim 1, further comprising a release mechanism, configured to constrain the elastic means when the handling element is in the hidden position and to release the elastic means, and release the elastic means upon reception of a control command emitted by the back-up condition detection means.

3. The vehicle door opening assembly according to claim 1, wherein the release mechanism blocks the slider in retracted position to constrain the elastic means, and in that the handling element is articulated to the slider using a hinge with a hinge pin having a breaking strength lower than the strength required to free the slider from the release mechanism when said mechanism is blocking the slider.

4. The vehicle door opening assembly according to claim 1, wherein the release mechanism comprises on one hand a shoulder on a side of the slider and on the other hand an electric actuator, and an actuator finger driven by said electric actuator from a locking position of the actuator finger in which it rests against the shoulder of the slider to block the slider in its retracted position, and a free position of the actuator finger in which the actuator finger releases the shoulder so that the slider can reach its deployed position.

5. The vehicle door opening assembly according to claim 4, wherein the electric actuator is a bistable relay with two extremal rest positions of an actuator finger, and a coil the actuation of which causes the actuator finger to switch from one to the other extremal position to move the actuator finger in its free position.

6. The vehicle door opening assembly according to claim 1, wherein the handling element comprises a ring, and in that the user pulls on said ring to bring it from the ready position to the release position.

7. The vehicle door opening assembly according to claim 1, wherein the emergency condition detection means comprises at least one of the following: an accelerometer to detect acceleration values higher than a predetermined threshold in case of collision, a voltmeter configured to detect a low charge state of a vehicle battery.

8. The vehicle door opening assembly according to claim 1, wherein the back-up release mechanism comprises a Bowden cable, connected on one hand to the guiding means or the handling element, and on the other hand to the door latch mechanism, with an inner cable being pulled with respect to a sleeve when the handling element reaches its release position, said pulling of the inner cable causing mechanical actuation of the door latch mechanism to release the vehicle door.

9. A vehicle door assembly comprising:
- a door panel, configured to be movable between a closed position in which it bars access to an inner space of a vehicle by fitting in a frame so as to close a bodywork of the vehicle and an open position in which it allows access to the inner space of the vehicle through the frame,
- a latch control unit, and authentication unit connected to said latch control unit configured to authenticate a user, the latch control unit being configured to automatically actuate a door latch mechanism to release the door panel in case of positive authentication, and
- the vehicle door opening assembly according to claim 1.

10. The vehicle door assembly according to claim 9, further comprising a cover flap, covering the handling element when in hidden position.

11. The vehicle door assembly according to claim 9, further comprising a signaling element situated in close proximity to the handling element when in ready position, the signaling element comprising:
- a light source,
- a transparent cover covering the light source, with an exterior surface through which light from the light source can be emitted to the exterior of the vehicle, and
- a back-up power source to provide electric power to the light source,
- the signalling element being connected to the back-up actuation condition detection means, and configured to power the light source when back-up actuation conditions are detected by said detection means to provide visual indication when the handling element is in ready position.

* * * * *